United States Patent [19]
Cohen et al.

[11] Patent Number: 5,803,106
[45] Date of Patent: Sep. 8, 1998

[54] ULTRASONIC APPARATUS AND METHOD FOR INCREASING THE FLOW RATE OF A LIQUID THROUGH AN ORIFICE

[75] Inventors: Bernard Cohen, Berkeley Lake; Lee Kirby Jameson, Roswell; Lamar Heath Gipson, Acworth, all of Ga.

[73] Assignee: Kimberly-Clark Worldwide, Inc., Neenah, Wis.

[21] Appl. No.: 576,174

[22] Filed: Dec. 21, 1995

[51] Int. Cl.$^6$ ....................................................... G05D 7/00
[52] U.S. Cl. ...................... 137/13; 137/828; 239/102.2; 251/129.06
[58] Field of Search ............................ 137/13, 827, 828; 239/102.2; 251/129.06; 366/127

[56] References Cited

U.S. PATENT DOCUMENTS

| | | | |
|---|---|---|---|
| 3,016,599 | 1/1962 | Perry, Jr. ...................................... | 28/78 |
| 3,042,481 | 7/1962 | Coggeshall .................................. | 18/54 |
| 3,194,855 | 7/1965 | Jones et al. ................................ | 264/70 |
| 3,203,215 | 8/1965 | Jones ........................................ | 72/253 |

(List continued on next page.)

FOREIGN PATENT DOCUMENTS

| | | |
|---|---|---|
| 165407 | 12/1985 | European Pat. Off. . |
| 202844 | 11/1986 | European Pat. Off. . |
| 235603 | 9/1987 | European Pat. Off. . |
| 300198 | 1/1989 | European Pat. Off. . |

(List continued on next page.)

OTHER PUBLICATIONS

V.A. Wente, "Superfine Thermoplastic Fibers", *Industrial & Engineering Chemistry*, V.48, N. 8, Naval Research Laboratory, Washington, D.C., pp. 1342–1346.

Wente, Boone & Fluharty, "Manufacture of Superfine Organic Fibers", Naval Research Laboratory, Washington, D.C., NRL Report 4364 (111437), May 25, 1954.

Buntin & Lohkamp,, "Melt Blowing–A One–Step Web Process for New Nonwoven Products", *TAPPI Journal*, V. 56, No. 4, pp. 74–77.

"Ultrasonics", *Encyclopedia of Chemical Technology*, 3rd Ed., V. 23, John Wiley & Sons, Inc., pp. 462–479.

"Degassing of Liquids", *Physical Principles of Ultrasonic Technology*, vol. 1, Plenum Press, 1973, pp. 381–509.

*Primary Examiner*—Gerald A. Michalsky
*Attorney, Agent, or Firm*—James E. Ruland

[57] ABSTRACT

An ultrasonic apparatus and method for increasing the flow rate of a pressurized liquid through an orifice by applying ultrasonic energy to a portion of the pressurized liquid. The apparatus includes a die housing which defines a chamber adapted to receive a pressurized liquid and a means for applying ultrasonic energy to a portion of the pressurized liquid. The die housing further includes an inlet adapted to supply the chamber with the pressurized liquid, and an exit orifice defined by the walls of a die tip. The exit orifice is adapted to receive the pressurized liquid from the chamber and pass the liquid out of the die housing. When the means for applying ultrasonic energy is excited, it applies ultrasonic energy to the pressurized liquid without applying ultrasonic energy to the die tip. The method involves supplying a pressurized liquid to the foregoing apparatus, applying ultrasonic energy to the pressurized liquid but not the die tip while the exit orifice receives pressurized liquid from the chamber, and passing the pressurized liquid out of the exit orifice in the die tip.

32 Claims, 7 Drawing Sheets

U.S. PATENT DOCUMENTS

| | | | |
|---|---|---|---|
| 3,233,012 | 2/1966 | Bodine | 264/23 |
| 3,285,442 | 11/1966 | Tigner | 264/70 |
| 3,341,394 | 9/1967 | Kinney | 161/72 |
| 3,463,321 | 8/1969 | Van Ingen | 210/388 |
| 3,619,429 | 11/1971 | Torigai et al. | 264/23 |
| 3,655,862 | 4/1972 | Dorschner et al. | 264/290 |
| 3,679,132 | 7/1972 | Vehe et al. | 239/102.2 X |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,729,138 | 4/1973 | Tysk | 239/102 |
| 3,755,527 | 8/1973 | Keller et al. | 264/210 |
| 3,802,817 | 4/1974 | Matsuki et al. | 425/66 |
| 3,819,116 | 6/1974 | Goodinge et al. | 239/102 |
| 3,849,241 | 11/1974 | Butin et al. | 161/169 |
| 3,853,651 | 12/1974 | Porte | 156/73.6 |
| 3,884,417 | 5/1975 | Sheffield et al. | 239/102 |
| 3,949,938 | 4/1976 | Goodinge | 239/102 |
| 3,977,604 | 8/1976 | Yokoyama et al. | 239/102 |
| 3,978,185 | 8/1976 | Butin et al. | 264/93 |
| 4,013,223 | 3/1977 | Martin | 239/102 |
| 4,038,348 | 7/1977 | Kompanek | 261/36 A |
| 4,048,963 | 9/1977 | Cottell | 239/102.2 X |
| 4,064,605 | 12/1977 | Akiyama et al. | 28/103 |
| 4,067,496 | 1/1978 | Martin | 239/102 |
| 4,091,140 | 5/1978 | Harmon | 428/288 |
| 4,100,319 | 7/1978 | Schwartz | 428/171 |
| 4,100,324 | 7/1978 | Anderson et al. | 428/288 E |
| 4,100,798 | 7/1978 | Nilsson et al. | 73/194 E |
| 4,105,004 | 8/1978 | Asai et al. | 123/141 |
| 4,118,531 | 10/1978 | Hauser | 428/224 |
| 4,121,549 | 10/1978 | Martin et al. | 123/32 EA |
| 4,127,087 | 11/1978 | Caves | 123/32 AE |
| 4,218,221 | 8/1980 | Cottell | 44/51 |
| 4,340,563 | 7/1982 | Appel et al. | 264/518 |
| 4,372,491 | 2/1983 | Fishgal | 239/102 |
| 4,389,999 | 6/1983 | Jaqua | 123/536 |
| 4,405,297 | 9/1983 | Appel et al. | 425/72 |
| 4,418,672 | 12/1983 | Muller et al. | 123/478 |
| 4,434,204 | 2/1984 | Hartman et al. | 428/198 |
| 4,466,571 | 8/1984 | Muhlbauer | 239/101 |
| 4,496,101 | 1/1985 | Northman | 239/102 |
| 4,500,280 | 2/1985 | Astier et al. | 425/569 |
| 4,526,733 | 7/1985 | Lau | 264/12 |
| 4,563,993 | 1/1986 | Yamauchi et al. | 123/478 |
| 4,576,136 | 3/1986 | Yamauchi et al. | 123/590 |
| 4,590,915 | 5/1986 | Yamauchi et al. | 123/590 |
| 4,627,811 | 12/1986 | Greiser et al. | 425/72 |
| 4,644,045 | 2/1987 | Fowells | 526/348 |
| 4,663,220 | 5/1987 | Wisneski et al. | 428/221 |
| 4,665,877 | 5/1987 | Manaka et al. | 123/472 |
| 4,715,353 | 12/1987 | Koike et al. | 123/590 |
| 4,716,879 | 1/1988 | Takayama et al. | 123/590 |
| 4,726,522 | 2/1988 | Kokubo et al. | 239/102.2 |
| 4,726,523 | 2/1988 | Kokubo et al. | 239/102.2 |
| 4,726,524 | 2/1988 | Ishikawa et al. | 239/102.2 |
| 4,726,525 | 2/1988 | Yonekawa et al. | 239/102.2 |
| 4,742,810 | 5/1988 | Anders et al. | 123/538 |
| 4,756,478 | 7/1988 | Endo et al. | 239/102.2 |
| 4,793,954 | 12/1988 | Lee et al. | 264/23 |
| 4,815,192 | 3/1989 | Usui et al. | 29/509 |
| 4,974,780 | 12/1990 | Nakamura et al. | 239/102.2 |
| 4,986,248 | 1/1991 | Kobayaski et al. | 123/590 |
| 4,995,367 | 2/1991 | Yamauchi et al. | 123/494 |
| 5,017,311 | 5/1991 | Furusawa et al. | 264/23 |
| 5,068,068 | 11/1991 | Furusawa et al. | 264/23 |
| 5,110,286 | 5/1992 | Gaysert et al. | 431/208 |
| 5,160,746 | 11/1992 | Dodge, II et al. | 425/7 |
| 5,169,067 | 12/1992 | Matsusaka et al. | 239/102.2 |
| 5,179,923 | 1/1993 | Tsurutani et al. | 123/435 |
| 5,226,364 | 7/1993 | Fadner | 101/366 |
| 5,269,981 | 12/1993 | Jameson et al. | 264/23 |
| 5,330,100 | 7/1994 | Malinowski | 239/102.2 |

FOREIGN PATENT DOCUMENTS

| | | |
|---|---|---|
| 303998 | 2/1989 | European Pat. Off. . |
| 2555829 | 6/1976 | Germany . |
| 2734818 | 8/1976 | Germany . |
| 134052 | 2/1978 | Germany . |
| 138523 | 11/1979 | Germany . |
| 3912524 | 11/1989 | Germany . |
| 49-133613 | 12/1974 | Japan . |
| 56-144214 | 11/1981 | Japan . |
| 57-51441 | 3/1982 | Japan . |
| 57-078967 | 5/1982 | Japan . |
| 57-099327 | 9/1982 | Japan . |
| 386977 | 5/1972 | U.S.S.R. . |
| 468948 | 7/1972 | U.S.S.R. . |
| 449504 | 10/1975 | U.S.S.R. . |
| 532529 | 5/1977 | U.S.S.R. . |
| 706250 | 12/1979 | U.S.S.R. . |
| 1812332 | 4/1993 | U.S.S.R. . |
| 1382828 | 2/1975 | United Kingdom . |
| 1415539 | 11/1975 | United Kingdom . |
| 1432760 | 4/1976 | United Kingdom . |
| 1555766 | 11/1979 | United Kingdom . |
| 2077351 | 12/1981 | United Kingdom . |
| 2082251 | 3/1982 | United Kingdom . |
| 2774877 | 8/1994 | United Kingdom . |
| 96/00318 | 1/1996 | WIPO . |

ULTRASONIC APPARATUS AND METHOD FOR INCREASING THE FLOW RATE OF A LIQUID THROUGH AN ORIFICE

BACKGROUND OF THE INVENTION

The present invention relates to an apparatus and method for modifying the flow rate of a liquid through an orifice.

SUMMARY OF THE INVENTION

The present invention addresses some of the difficulties and problems discussed above by providing an apparatus and a method for increasing the flow rate of a pressurized liquid through an orifice by applying ultrasonic energy to a portion of the pressurized liquid.

The apparatus includes a die housing which defines a chamber adapted to receive a pressurized liquid and a means for applying ultrasonic energy to a portion of the pressurized liquid. The die housing includes a chamber adapted to receive the pressurized liquid, an inlet adapted to supply the chamber with the pressurized liquid, and an exit orifice (or a plurality of exit orifices) defined by the walls of a die tip, the exit orifice being adapted to receive the pressurized liquid from the chamber and pass the liquid out of the die housing. Generally speaking, the means for applying ultrasonic energy is located within the chamber. For example, the means for applying ultrasonic energy may be an immersed ultrasonic horn. According to the invention, the means for applying ultrasonic energy is located within the chamber in a manner such that no ultrasonic energy is applied to the die tip (i.e., the walls of the die tip defining the exit orifice).

In one embodiment of the present invention, the die housing may have a first end and a second end. One end of the die housing forms a die tip having walls that define an exit orifice which is adapted to receive a pressurized liquid from the chamber and pass the pressurized liquid along a first axis. The means for applying ultrasonic energy to a portion of the pressurized liquid is an ultrasonic horn having a first end and a second end. The horn is adapted, upon excitation by ultrasonic energy, to have a node and a longitudinal mechanical excitation axis. The horn is located in the second end of the die housing in a manner such that the first end of the horn is located outside of the die housing and the second end is located inside the die housing, within the chamber, and is in close proximity to the exit orifice.

The longitudinal excitation axis of the ultrasonic horn desirably will be substantially parallel with the first axis. Furthermore, the second end of the horn desirably will have a cross-sectional area approximately the same as or greater than a minimum area which encompasses all exit orifices in the die housing. Upon excitation by ultrasonic energy, the ultrasonic horn in adapted to apply ultrasonic energy to the pressurized liquid within the chamber (defined by the die housing) but not to the die tip which has walls that define the exit orifice.

The present invention contemplates the use of an ultrasonic horn having a vibrator means coupled to the first end of the horn. The vibrator means may be a piezoelectric transducer or a magnetostrictive transducer. The transducer may be coupled directly to the horn or by means of an elongated waveguide. The elongated waveguide may have any desired input:output mechanical excitation ratio, although ratios of 1:1 and 1:1.5 are typical for many applications. The ultrasonic energy typically will have a frequency of from about 15 kHz to about 500 kHz, although other frequencies are contemplated.

According to the present invention, the ultrasonic horn may be composed of a magnetostrictive material. The horn may be surrounded by a coil (which may be immersed in the liquid) capable of inducing a signal into the magnetostrictive material causing it to vibrate at ultrasonic frequencies. In such cases, the ultrasonic horn can simultaneously be the transducer and the means for applying ultrasonic energy to the liquid.

In an aspect of the present invention, the exit orifice may have a diameter of less than about 0.1 inch (2.54 mm). For example, the exit orifice may have a diameter of from about 0.0001 to about 0.1 inch (0.00254 to 2.54 mm) As a further example, the exit orifice may have a diameter of from about 0.001 to about 0.01 inch (0.0254 to 0.254 mm).

According to the invention, the exit orifice may be a single exit orifice or a plurality of exit orifices. The exit orifice may be an exit capillary. The exit capillary may have a length to diameter ratio (L/D ratio) of ranging from about 4:1 to about 10:1. Of course, the exit capillary may have a L/D ratio of less than 4:1 or greater than 10:1.

The present invention encompasses a method of increasing the flow rate of a pressurized liquid through an orifice. The method involves supplying a pressurized liquid to the apparatus described above, exciting the means for applying ultrasonic energy with ultrasonic energy while the exit orifice receives pressurized liquid from the chamber (without applying ultrasonic energy to the die tip), and passing the pressurized liquid out of the exit orifice in the die tip.

According to the present invention, the flow rate of the pressurized liquid may be at least about 25 percent greater than the flow rate of an identical pressurized liquid out of an identical die housing through an identical exit orifice in the absence of excitation by ultrasonic energy. For example, the flow rate of the pressurized liquid is at least about 75 percent greater. As another example, the flow rate of the pressurized liquid is at least about 200 percent greater.

Generally speaking, the increase in flow rate of the pressurized liquid may be achieved without significant elevation in the temperature of the pressurized liquid and/or without significant elevation in the supplied pressure of the pressurized liquid.

It is contemplated that the apparatus and method of the present invention has a very wide variety of applications where pressurized liquid is passed out of an orifice. For example, the apparatus and method may be used in fuel injectors for liquid-fueled combustors. Exemplary combustors include, but are not limited to, boilers, kilns, industrial and domestic furnaces, incinerators. The apparatus and method may be used in fuel injectors for discontinuous flow internal combustion engines (e.g., reciprocating piston gasoline and diesel engines). The apparatus and method may also be used in fuel injectors for continuous flow engines (e.g., Sterling-cycle heat engines and gas turbine engines).

The apparatus and method of the present invention may also be used to provide flow control in both open and closed circuit hydraulic systems in a variety of settings including, but not limited to, automotive, construction, industrial, agricultural and robotic.

It is also contemplated that the apparatus and method of the present invention may be used to control the phase change rate of liquid refrigerants by utilizing equipment such as, for example, ultrasonically controlled thermal expansion valves. The apparatus and method of the present invention can also provide advantages in the mass transfer and container filling operations for a variety of food products, especially food products that tend to be viscous.

DETAILED DESCRIPTION OF THE INVENTION

Figure 1:
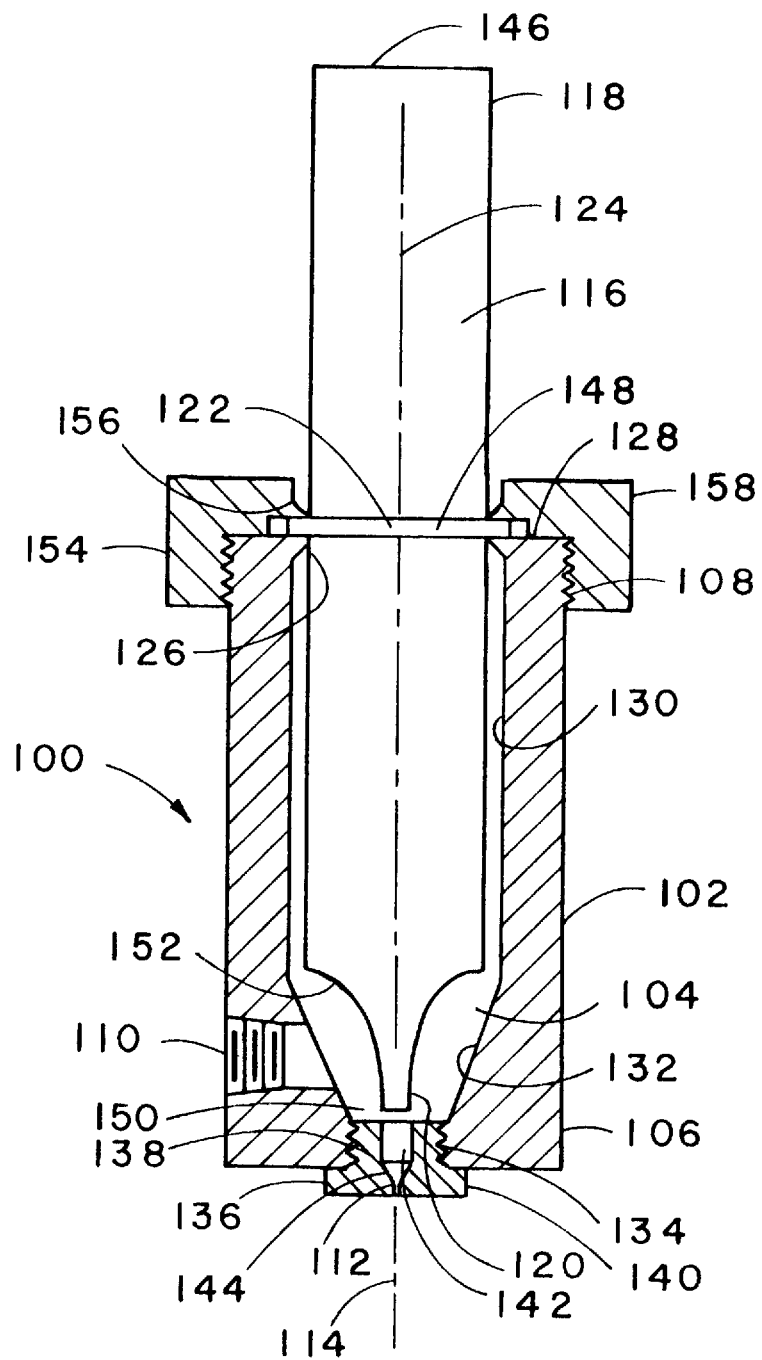
FIG. 1 is a diagrammatic cross-sectional representation of one embodiment of the apparatus of the present invention.

As used herein, the term "liquid" refers to an amorphous (noncrystalline) form of matter intermediate between gases and solids, in which the molecules are much more highly concentrated than in gases, but much less concentrated than in solids. A liquid may have a single component or may be made of multiple components. The components may be other liquids, solid and/or gases. For example, Characteristic of liquids is their ability to flow as a result of an applied force. Liquids that flow immediately upon application of force and for which the rate of flow is directly proportional to the force applied are generally referred to as Newtonian liquids. Some liquids have abnormal flow response when force is applied and exhibit non-Newtonian flow properties.

As used herein, the terms "thermoplastic material" and "thermoplastic polymer" refer to a polymer that softens when exposed to heat and returns to a relatively hardened condition when cooled to room temperature. Natural substances which exhibit this behavior are crude rubber and a number of waxes. Other exemplary thermoplastic materials include, without limitation, polyvinyl chloride, polyesters, nylons, polyfluorocarbons, polyolefins (including polypropylene, polyethylene, linear low density polyethylene, etc.), polyurethane, polystyrene, polypropylene, polyvinyl alcohol, caprolactams, and acrylic resins.

As used herein, the term "node" means the point on the longitudinal excitation axis of the ultrasonic horn at which no longitudinal motion of the horn occurs upon excitation by ultrasonic energy. The node sometimes is referred in the art, as well as in this specification, as the nodal point.

The term "close proximity" is used herein in a qualitative sense only. That is, the term is used to mean that the means for applying ultrasonic energy is sufficiently close to the exit orifice (e.g., extrusion orifice) to apply the ultrasonic energy primarily to the liquid (e.g., molten thermoplastic polymer) passing into the exit orifice (e.g., extrusion orifice). The term is not used in the sense of defining specific distances from the extrusion orifice.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, solvents, particulates and materials added to enhance processability of the composition.

Generally speaking, the apparatus of the present invention includes a die housing and a means for applying ultrasonic energy to a portion of a pressurized liquid (e.g., a molten thermoplastic polymers, hydrocarbon oils, water, slurries, suspensions or the like). The die housing defines a chamber adapted to receive the pressurized liquid, an inlet (e.g., inlet orifice) adapted to supply the chamber with the pressurized liquid, and an exit orifice (e.g., extrusion orifice) adapted to receive the pressurized liquid from the chamber and pass the liquid out of the exit orifice of the die housing. The means for applying ultrasonic energy is located within the chamber. For example, the means for applying ultrasonic energy can be located partially within the chamber or the means for applying ultrasonic energy can be located entirely within the chamber.

Referring now to FIG. 1, there is shown, not necessarily to scale, an exemplary apparatus for increasing the flow rate of a pressurized liquid through an orifice. The apparatus 100 includes a die housing 102 which defines a chamber 104 adapted to receive a pressurized liquid (e.g., oil, water, molten thermoplastic polymer, syrup or the like). The die housing 102 has a first end 106 and a second end 108. The die housing 102 also has an inlet 110 (e.g., inlet orifice) adapted to supply the chamber 104 with the pressurized liquid. An exit orifice 112 (which may also be referred to as an extrusion orifice) is located in the first end 106 of the die housing 102; it is adapted to receive the pressurized liquid from the chamber 104 and pass the liquid out of the die housing 102 along a first axis 114. An ultrasonic horn 116 is located in the second end 108 of the die housing 102. The ultrasonic horn has a first end 118 and a second end 120. The horn 116 is located in the second end 108 of the die housing 102 in a manner such that the first end 118 of the horn 116 is located outside of the die housing 102 and the second end 120 of the horn 116 is located inside the die housing 102, within the chamber 104, and is in close proximity to the exit orifice 112. The horn 116 is adapted, upon excitation by ultrasonic energy, to have a nodal point 122 and a longitudinal mechanical excitation axis 124. Desirably, the first axis 114 and the mechanical excitation axis 124 will be substantially parallel. More desirably, the first axis 114 and the mechanical excitation axis 124 will substantially coincide, as shown in FIG. 1.

The size and shape of an apparatus 200 of the present invention can vary widely, depending, at least in part, on the number and arrangement of exit orifices (e.g., extrusion orifices) and the operating frequency of the means for applying ultrasonic energy. For example, the die housing may be cylindrical, rectangular, or any other shape. Moreover, the die housing may have a single exit orifice or a plurality 212 of exit orifices. The plurality 212 of exit orifices may be arranged in a pattern, including but not limited to, a linear or a circular pattern.

The means for applying ultrasonic energy is located within the chamber, typically at least partially surrounded by the pressurized liquid. Such means is adapted to apply the ultrasonic energy to the pressurized liquid as it passes into the exit orifice. Stated differently, such means is adapted to apply ultrasonic energy to a portion of the pressurized liquid in the vicinity of each exit orifice. Such means may be located completely or partially within the chamber.

When the means for applying ultrasonic energy is an ultrasonic horn, the horn conveniently extends through the die housing, such as through the first end of the housing as identified in FIG. 1. However, the present invention comprehends other configurations. For example, the horn may extend through a wall of the die housing, rather than through an end. Moreover, neither the first axis nor the longitudinal excitation axis of the horn need to be vertical. If desired, the longitudinal mechanical excitation axis of the horn may be at an angle to the first axis. Nevertheless, the longitudinal mechanical excitation axis of the ultrasonic horn desirably will be substantially parallel with the first axis. More desirably, the longitudinal mechanical excitation axis of the ultrasonic horn desirably and the first axis will substantially coincide, as shown in FIG. 1.

If desired, more than one means for applying ultrasonic energy may be located within the chamber defined by the die housing. Moreover, a single means may apply ultrasonic energy to the portion of the pressurized liquid which is in the vicinity of one or more exit orifices.

According to the present invention, the ultrasonic horn may be composed of a magnetostrictive material. The horn may be surrounded by a coil (which may be immersed in the liquid) capable of inducing a signal into the magnetostrictive material causing it to vibrate at ultrasonic frequencies. In such cases, the ultrasonic horn can simultaneously be the transducer and the means for applying ultrasonic energy to the multi-component liquid.

The application of ultrasonic energy to a plurality of exit orifices may be accomplished by a variety of methods. For example, with reference again to the use of an ultrasonic horn, the second end of the horn may have a cross-sectional area which is sufficiently large so as to apply ultrasonic energy to the portion of the pressurized liquid which is in the vicinity of all of the exit orifices in the die housing. In such case, the second end of the ultrasonic horn desirably will have a cross-sectional area approximately the same as or greater than a minimum area which encompasses all exit orifices in the die housing (i.e., a minimum area which is the same as or greater than the sum of the areas of the exit orifices in the die housing originating in the same chamber). Alternatively, the second end of the horn may have a plurality of protrusions, or tips, equal in number to the number of exit orifices. In this instance, the cross-sectional area of each protrusion or tip desirably will be approximately the same as or less than the cross-sectional area of the exit orifice with which the protrusion or tip is in close proximity.

The planar relationship between the second end of the ultrasonic horn and an array of exit orifices may also be shaped (e.g., parabolically, hemispherically, or provided with a shallow curvature) to provide or correct for certain spray patterns.

As already noted, the term "close proximity" is used herein to mean that the means for applying ultrasonic energy is sufficiently close to the exit orifice to apply the ultrasonic energy primarily to the pressurized liquid passing into the exit orifice. The actual distance of the means for applying ultrasonic energy from the exit orifice in any given situation will depend upon a number of factors, some of which are the flow rate of the pressurized liquid (e.g., the melt flow rate of a molten thermoplastic polymer or the viscosity of a liquid), the cross-sectional area of the end of the means for applying the ultrasonic energy relative to the cross-sectional area of the exit orifice, the frequency of the ultrasonic energy, the gain of the means for applying the ultrasonic energy (e.g., the magnitude of the longitudinal mechanical excitation of the means for applying ultrasonic energy), the temperature of the pressurized liquid, and the rate at which the liquid passes out of the exit orifice.

In general, the distance of the means for applying ultrasonic energy from the exit orifice in a given situation may be determined readily by one having ordinary skill in the art without undue experimentation. In practice, such distance will be in the range of from about 0.002 inch (about 0.05 mm) to about 1.3 inches (about 33 mm), although greater distances can be employed. Such distance determines the extent to which ultrasonic energy is applied to the pressurized liquid other than that which is about to enter the exit orifice; i.e., the greater the distance, the greater the amount of pressurized liquid which is subjected to ultrasonic energy. Consequently, shorter distances generally are desired in order to minimize degradation of the pressurized liquid and other adverse effects which may result from exposure of the liquid to the ultrasonic energy.

One advantage of the apparatus of the present invention is that it is self-cleaning. That is, the combination of supplied pressure and forces generated by ultrasonically exciting the means for supplying ultrasonic energy to the pressurized liquid (without applying ultrasonic energy directly to the orifice) can remove obstructions that appear to block the exit orifice (e.g., extrusion orifice). According to the invention, the exit orifice is adapted to be self-cleaning when the means for applying ultrasonic energy is excited with ultrasonic energy (without applying ultrasonic energy directly to the orifice) while the exit orifice receives pressurized liquid from the chamber and passes the liquid out of the die housing.

Desirably, the means for applying ultrasonic energy is an immersed ultrasonic horn having a longitudinal mechanical excitation axis and in which the end of the horn located in the die housing nearest the orifice is in close proximity to the exit orifice but does not apply ultrasonic energy directly to the exit orifice.

It is contemplated that the apparatus and method of the present invention has a very wide variety of applications where pressurized liquid is passed out of an orifice. For example, the apparatus and method may be used in fuel injectors for liquid-fueled combustors. Exemplary combustors include, but are not limited to, boilers, kilns, industrial and domestic furnaces, incinerators. Many of these combustors use heavy liquid fuels that may be advantageously handled by the apparatus and method of the present invention.

Internal combustion engines present other applications where the apparatus and method of the present invention may be used with fuel injectors. For example, the apparatus and method may be used in fuel injectors for discontinuous flow reciprocating piston gasoline and diesel engines. More particularly, a means for delivering ultrasonic vibrations is incorporated within a fuel injector. The vibrating element is placed so as to be in contact with the fuel as it enters an exit orifice. The vibrating element is aligned so the axis of its vibrations are parallel with the axis of the orifice. Immediately before the liquid fuel enters the exit orifice, the vibrating element in contact with the liquid fuel applies ultrasonic energy to the fuel. The vibrations appear to change the apparent viscosity and flow characteristics of the liquid fuel, resulting in an improved flow rate and/or improved atomization of the fuel stream as it enters the combustion cylinder.

Flow enhancement of viscous liquids present other applications for the apparatus and method of the present invention. For example, the present invention may be used to enhance the flow of molten bitumens, viscous paints, hot melt adhesives, syrups, heavy oils, emulsions, slurries and suspensions and the like.

The apparatus and method of the present invention can also provide advantages in the mass transfer and/or container filling operations for a variety of food products, especially food products that tend to be viscous. For example, it is contemplated that the present invention may be used in the simultaneous process and fill operations of food product emulsions including, but not limited to, mayonnaise, salad dressing, spreads or the like.

The present invention is further described by the examples which follow. Such examples, however, are not to be construed as limiting in any way either the spirit or the scope of the present invention.

EXAMPLES

Ultrasonic Horn Apparatus

The following is a description of an exemplary ultrasonic horn apparatus of the present invention generally as shown in FIG. 1.

With reference to FIG. 1, the die housing 102 of the apparatus was a cylinder having an outer diameter of 1.375 inches (about 34.9 mm), an inner diameter of 0.875 inch (about 22.2 mm), and a length of 3.086 inches (about 78.4 mm). The outer 0.312-inch (about 7.9-mm) portion of the second end 108 of the die housing was threaded with 16-pitch threads. The inside of the second end had a beveled edge 126, or chamfer, extending from the face 128 of the second end toward the first end 106 a distance of 0.125 inch (about 3.2 mm). The chamfer reduced the inner diameter of the die housing at the face of the second end to 0.75 inch (about 19.0 mm). An inlet 110 (also called an inlet orifice) was drilled in the die housing, the center of which was 0.688 inch (about 17.5 mm) from the first end, and tapped. The inner wall of the die housing consisted of a cylindrical portion 130 and a conical frustrum portion 132. The cylindrical portion extended from the chamfer at the second end toward the first end to within 0.992 inch (about 25.2 mm) from the face of the first end. The conical frustrum portion extended from the cylindrical portion a distance of 0.625 inch (about 15.9 mm), terminating at a threaded opening 134 in the first end. The diameter of the threaded opening was 0.375 inch (about 9.5 mm); such opening was 0.367 inch (about 9.3 mm) in length.

A die tip 136 was located in the threaded opening of the first end. The die tip consisted of a threaded cylinder 138 having a circular shoulder portion 140. The shoulder portion was 0.125 inch (about 3.2 mm) thick and had two parallel faces (not shown) 0.5 inch (about 12.7 mm) apart. An exit orifice 112 (also called an extrusion orifice) was drilled in the shoulder portion and extended toward the threaded portion a distance of 0.087 inch (about 2.2 mm). The diameter of the extrusion orifice was 0.0145 inch (about 0.37 mm). The extrusion orifice terminated within the die tip at a vestibular portion 142 having a diameter of 0.125 inch (about 3.2 mm) and a conical frustrum portion 144 which joined the vestibular portion with the extrusion orifice. The wall of the conical frustrum portion was at an angle of 30° from the vertical. The vestibular portion extended from the extrusion orifice to the end of the threaded portion of the die tip, thereby connecting the chamber defined by the die housing with the extrusion orifice.

The means for applying ultrasonic energy was a cylindrical ultrasonic horn 116. The horn was machined to resonate at a frequency of 20 kHz. The horn had a length of 5.198 inches (about 132.0 mm), which was equal to one-half of the resonating wavelength, and a diameter of 0.75 inch (about 19.0 mm). The face 146 of the first end 118 of the horn was drilled and tapped for a ⅜-inch (about 9.5-mm) stud (not shown). The horn was machined with a collar 148 at the nodal point 122. The collar was 0.094-inch (about 2.4-mm) wide and extended outwardly from the cylindrical surface of the horn 0.062 inch (about 1.6 mm). Thus, the diameter of the horn at the collar was 0.875 inch (about 22.2 mm). The second end 120 of the horn terminated in a small cylindrical tip 150 0.125 inch (about 3.2 mm) long and 0.125 inch (about 3.2 mm) in diameter. Such tip was separated from the cylindrical body of the horn by a parabolic frustrum portion 152 approximately 0.5 inch (about 13 mm) in length. That is, the curve of this frustrum portion as seen in cross-section was parabolic in shape. The face of the small cylindrical tip was normal to the cylindrical wall of the horn and was located about 0.4 inch (about 10 mm) from the extrusion orifice. Thus, the face of the tip of the horn, i.e., the second end of the horn, was located immediately above the vestibular opening in the threaded end of the die tip.

The first end 108 of the die housing was sealed by a threaded cap 154 which also served to hold the ultrasonic horn in place. The threads extended upwardly toward the top of the cap a distance of 0.312 inch (about 7.9 mm). The outside diameter of the cap was 2.00 inches (about 50.8 mm) and the length or thickness of the cap was 0.531 inch (about 13.5 mm). The opening in the cap was sized to accommodate the horn; that is, the opening had a diameter of 0.75 inch (about 19.0 mm). The edge of the opening in the cap was a chamfer 156 which was the mirror image of the chamfer at the second end of the die housing. The thickness of the cap at the chamfer was 0.125 inch (about 3.2 mm), which left a space between the end of the threads and the bottom of the chamfer of 0.094 inch (about 2.4 mm), which space was the same as the length of the collar on the horn. The diameter of such space was 1.104 inch (about 28.0 mm). The top 158 of the cap had drilled in it four ¼-inch diameter×¼-inch deep holes (not shown) at 90° intervals to accommodate a pin spanner. Thus, the collar of the horn was compressed between the two chamfers upon tightening the cap, thereby sealing the chamber defined by the die housing.

A Branson elongated aluminum waveguide having an input:output mechanical excitation ratio of 1:1.5 was coupled to the ultrasonic horn by means of a ⅜-inch (about 9.5-mm) stud. To the elongated waveguide was coupled a piezoelectric transducer, a Branson Model 502 Converter, which was powered by a Branson Model 1120 Power Supply operating at 20 kHz (Branson Sonic Power Company, Danbury, Connecticut). Power consumption was monitored with a Branson Model A410A Wattmeter.

Example 1

This example illustrates the present invention as it relates to relatively viscous materials such as, for example, molten thermoplastic materials. As used in the following examples, the term "melt flow rate" means the melt flow rate as measured in accordance with ASTM Method D-1238. The term "flow rate" is used to identify the experimentally determined rate of flow of pressurized liquid (e.g., molten thermoplastic polymer, oil, or the like) through an exit orifice (e.g., extrusion orifice) in an apparatus of the present invention.

More particularly, the term "melt flow rate" refers to the amount of material under a pressure or load that flows through an orifice at a given temperature over a specified period of time. The melt flow rate is expressed in units of mass divided by time (i.e., grams/10 minutes). The melt flow rate was determined by measuring the mass of molten thermoplastic polymer under a 2.160 kg load that flowed through an orifice diameter of 2.0995±0.0051 mm during a specified time period such as, for example, 10 minutes at a specified temperature such as, for example, 180° C. as determined in accordance with ASTM Test Method D1238-

82, "Standard Test Method for Flow Rates of Thermoplastic By Extrusion Plastometer," using a Model VE 4-78 Extrusion Plastometer (Tinius Olsen Testing Machine Co., Willow Grove, Pa.).

The thermoplastic material used in the example was a polypropylene having a melt flow rate of 400 grams per 10 minutes, or g/10 min. (Himont HH-441, Himont Company, Wilmington, Del.) having no melt processing additives. The polymer was melted in a constant pressure batch extruder manufactured by Alex James and Associates, Greenville, S.C. The principal components of the extruder consisted of a pressure barrel, approximately 3 inches (about 80 mm) in length with an axial bore of 1.0 inch (about 25 mm) diameter. A pressurizing piston of 1.0 inch (about 25 mm) diameter and approximately 4 inches (about 100 mm) in length was fitted into the end of the barrel and sealed by a packing gland. The opposite end of the barrel was fitted with a flange secured by bolts which accommodated a filter and seal, and provided a means for connecting piping to the outlet of the barrel assembly. In operation, the barrel assembly was heated by clamping it within a jacket of imbedded cartridge heaters. The barrel temperature was sensed by a thermocouple that was in contact with the outer surface of the barrel. The molten charge in the barrel was pressurized by forcing the piston into the barrel. This force was provided by a hydraulic ram. System pressure was monitored by a pressure gauge on the hydraulic line to the ram.

As the piston was forced into the reservoir under constant pressure, molten polymer exited through an outlet in the other end of the reservoir into an approximately 4inch (about 10-cm) length of ¼-inch (about 6.4-mm) diameter stainless steel tubing. The tubing was connected to the inlet (e.g., inlet orifice) of an apparatus of the present invention as shown in FIG. 1 and described above.

The stainless steel tubing leading from the reservoir to the die housing and the die housing itself were wrapped with flexible heating tape which secured a thermocouple to the tubing and die housing. The reservoir was maintained at a temperature of about 177° C. and the tubing and the die housing were maintained at a temperatures of approximately 190° C. and 260° C., respectively. The temperature of the die tip was about 190° C., as measured with a hand-held pyrometer, a Digi-Sense Type K Digital Thermometer (Cole-Parmer Instrument Company, Niles, Ill.); the temperature of the extruded polymer was found to be about 249° C. A hydraulic pressure of 150 pounds per square inch, gauge (psig) then was applied by the hydraulic ram to the piston. When the flow of molten polymer from the extrusion orifice started, a two-minute mass sample was collected in a tared aluminum sampling pan held about 2 inches (about 5 cm) below the die tip. The sampling pan was reweighed and the flow rate of extruded polymer in grams per minute (g/min.) was calculated. Ultrasonic power then was turned on with the power setting at 100 percent, resulting in an output power of 80 watts. A sample was taken and the flow rate calculated, as before.

When the power to the horn was off, the flow rate was 0.05 g/min. With 100 percent power being applied to the horn the flow rate was 0.345 g/min., even though the extrusion pressure was constant during both experiments. At the same extrusion pressure, the flow rate was increased about 7-fold by the application of ultrasonic energy in accordance with the present invention.

While taking the sample with ultrasonic power applied, it was noted that the reading of the wattmeter was slightly unstable and that changes in the audible harmonics emanating from the horn seemed to match the pattern of power variation. These observations indicated that the extremely low flow rate was allowing cavitation to occur at the horn/polymer interface. Subsequent microscopic examination of the extruded fiber gathered in the sample cup revealed the presence of bubbles within the fiber, evidently formed by the cavitation extraction of gas from the melt.

Example 2

The procedure of Example 1 was repeated, except that the polymer employed was a polypropylene having a melt flow rate of 30 g/10 min. (Escorene PP-3445, Exxon Chemical Americas, Houston, Tex. 77079) and lacking melt processing additives, and the elongated waveguide was replaced with one having an input:output mechanical excitation ratio of 1:1. In addition, precision hydraulic and pneumatic gauges, as well as a precision air pressure regulator, were added to the extrusion system. Also, a ¼-inch (about 6.4-mm) thick layer of rigid mineral insulation board was attached to the die tip to minimize heat loss.

Six trials were run, with conditions and results being summarized in Table 1. In the table, the "Pressure" column is the hydraulic pressure in psig as described in Example 1, the "Temp." column identifies the temperature of each of the extruder, pipe, and die housing in degrees Celsius as described in Example 1, the "Percent" column under the "Power" heading refers to the percentage of maximum ultrasonic power being applied to the horn, the "Watts" column under the "Power" heading refers to power consumption at a given power setting, and the "Rate" column refers to the flow rate measured for each trial, expressed in g/min.

TABLE 1

Summary of Trials with Escorene PP-3445

| | | | | Power | |
| --- | --- | --- | --- | --- | --- |
| Trial | Pressure | Temp. | Percent | Watts | Rate |
| 1 | 150 | 249 | 0 | 0 | 1.62 |
| | | | 50 | 50 | 1.90 |
| | | | 100 | 80 | 3.50 |
| 2 | 150 | 232 | 0 | 0 | 1.16 |
| | | | 50 | 50 | 1.38 |
| | | | 100 | 80 | 1.74[a] |
| 3 | 150 | 221 | 0 | 0 | 0.44 |
| | | | 50 | 50 | 0.59[a] |
| | | | 100 | 80 | 0.60 |
| 4 | 200 | 221 | 0 | 0 | 2.18 |
| | | | 50 | 45 | 2.64[a] |
| | | | 100 | 80 | 4.14[a] |
| 5 | 200 | 232 | 0 | 0 | 1.24 |
| | | | 50 | 45 | 2.50 |
| | | | 100 | 80 | 3.50[a] |
| 6 | 200 | 249 | 0 | 0 | 1.35 |
| | | | 50 | 45 | 2.63 |
| | | | 100 | 80 | 4.35 |

[a]Cavitation and stream disruption (bubble formation).

Because each trial required dismantling the extruder to load the reservoir with polymer, it was difficult to reassemble the extruder without introducing some variations in the tightness of the piston packing gland, the fit of the piston in the barrel, the wrapping of the stainless steel tubing and the die housing with the heating tape, and manual control of the tubing and die housing temperatures. Such variables, as well as others, preclude a rigorous comparison of one trial with another. However, trends within each trial, as well as general trial-to-trial observations, are meaningful.

It is evident that the application of ultrasonic energy increases the flow rate of molten polymer through the extrusion orifice, regardless of extrusion pressure or temperature. The extent of the improvement appears to be a function of both extrusion pressure and temperature. In other words, increasing either pressure or temperature increases flow rate, although the effect of pressure appears to be greater.

Example 3

In this example, the constant pressure batch extruder employed in the previous two examples was replaced with a Grid Melter, Model GM-25-1, obtained from J&M Laboratories Inc. of Dawsonville, Ga. The device has the capability to process up to 25 pounds of polymer per hour (about 11 kilograms per hour), and has an integral variable speed gear pump with a displacement of 1.752 cc/revolution. Temperature of the melt is regulated in two zones, premelt and main melt. Pressure is limited and regulated by an internal variable by-pass valve, and indicated by digital readout resolved to increments of 10 psi. Pump drive speed is controlled by a panel mounted potentiometer.

The Grid Melter was used to melt and pressurize the polymers. It eliminated the need for dismantling equipment between trials as required in previous examples. The first polymer used was the Escorene PP-3445 (Trials 1–18, inclusive) and the second was the Himont HH-441 (Trials 19–42, inclusive). Pump drive speed was arbitrarily set at approximately 30 percent of the potentiometer range, and pressure was set and controlled by adjusting the by-pass valve. A 9-inch (about 23-cm) length of ¼-inch (about 6.4-mm) diameter stainless steel tubing was attached from the outlet of the Grid Melter to the inlet of the die housing. The tubing and the extrusion cup were wrapped with heat tape as two zones, and the two zones were set and controlled by automatic heat controllers. All heat zones in both the grid melter and the extrusion apparatus were set to the same point. In addition, the pressure of the Grid Melter was set only at the beginning of each series of trials. The results of the trials are summarized in Tables 2 and 3. In the tables, the "Pressure" column is the Grid Melter pressure in psig, the "Temp." column identifies the temperature set point in degrees Celsius of all heating zones, the "Percent" column under the "Power" heading refers to the percentage of maximum ultrasonic power being applied to the horn, the "Watts" column under the "Power" heading refers to power consumption at a given power setting, and the "Rate" column refers to the flow rate measured for each trial, expressed in g/min.

TABLE 2

Summary of Trials with Escorene PP-3445

| Trial | Pressure | Temp. | Power Percent | Watts | Rate |
|---|---|---|---|---|---|
| 1 | 350[a] | 188 | 0 | 0 | 0.76 |
| 2 | 350 | 188 | 30 | 40 | 1.66 |
| 3 | 340 | 188 | 40 | 50 | 2.08 |
| 4 | 340 | 194 | 0 | 0 | 0.76 |
| 5 | 340 | 194 | 30 | 40 | 1.56 |
| 6 | 340 | 194 | 40 | 50 | 2.01 |
| 7 | 350 | 182 | 0 | 0 | 0.68 |
| 8 | 350 | 182 | 30 | 40 | 1.38 |
| 9 | 340 | 182 | 40 | 50 | 1.85 |
| 10 | 420[a] | 182 | 0 | 0 | 0.97 |

TABLE 2-continued

Summary of Trials with Escorene PP-3445

| Trial | Pressure | Temp. | Power Percent | Watts | Rate |
|---|---|---|---|---|---|
| 11 | 420 | 182 | 30 | 38 | 1.78 |
| 12 | 410 | 182 | 40 | 50 | 2.29 |
| 13 | 410 | 188 | 0 | 0 | 1.02 |
| 14 | 400 | 188 | 30 | 40 | 1.84 |
| 15 | 400 | 188 | 40 | 50 | 2.36 |
| 16 | 400 | 194 | 0 | 0 | 1.06 |
| 17 | 390 | 194 | 30 | 40 | 1.96 |
| 18 | 380 | 194 | 40 | 50 | 2.40 |

[a]Initial pressure setting of the Grid Melter.

TABLE 3

Summary of Trials with Himont HH-441

| Trial | Pressure | Temp. | Power Percent | Watts | Rate |
|---|---|---|---|---|---|
| 19 | 360[a] | 177 | 0 | 0 | 1.69 |
| 20 | 360 | 177 | 40 | 50 | 3.33 |
| 21 | 340 | 177 | 70 | 75 | 4.69 |
| 22 | 330 | 182 | 0 | 0 | 1.51 |
| 23 | 330 | 182 | 44 | 50 | 3.16 |
| 24 | 320 | 182 | 70 | 75 | 4.75 |
| 25 | 340 | 188 | 0 | 0 | 1.81 |
| 26 | 330 | 188 | 40 | 50 | 3.53 |
| 27 | 320 | 188 | 70 | 75 | 4.93 |
| 28 | 340 | 194 | 0 | 0 | 1.96 |
| 29 | 320 | 194 | 40 | 50 | 3.95 |
| 30 | 310 | 194 | 70 | 75 | 5.14 |
| 31 | 500[a] | 177 | 0 | 0 | 3.42 |
| 32 | 510 | 177 | 40 | 53 | 5.42 |
| 33 | 510 | 177 | 70 | 75 | 7.33 |
| 34 | 500 | 182 | 0 | 0 | 3.96 |
| 35 | 510 | 182 | 40 | 50 | 6.17 |
| 36 | 460 | 182 | 70 | 70 | 7.85 |
| 37 | 500 | 188 | 0 | 0 | 4.47 |
| 38 | 490 | 188 | 40 | 50 | 6.72 |
| 39 | 490 | 188 | 70 | 72 | 9.11 |
| 40 | 510 | 194 | 0 | 0 | 5.51 |
| 41 | 500 | 194 | 40 | 50 | 7.99 |
| 42 | 490 | 194 | 70 | 72 | 10.41 |

[a]Initial pressure setting of the Grid Melter.

Figure 2:
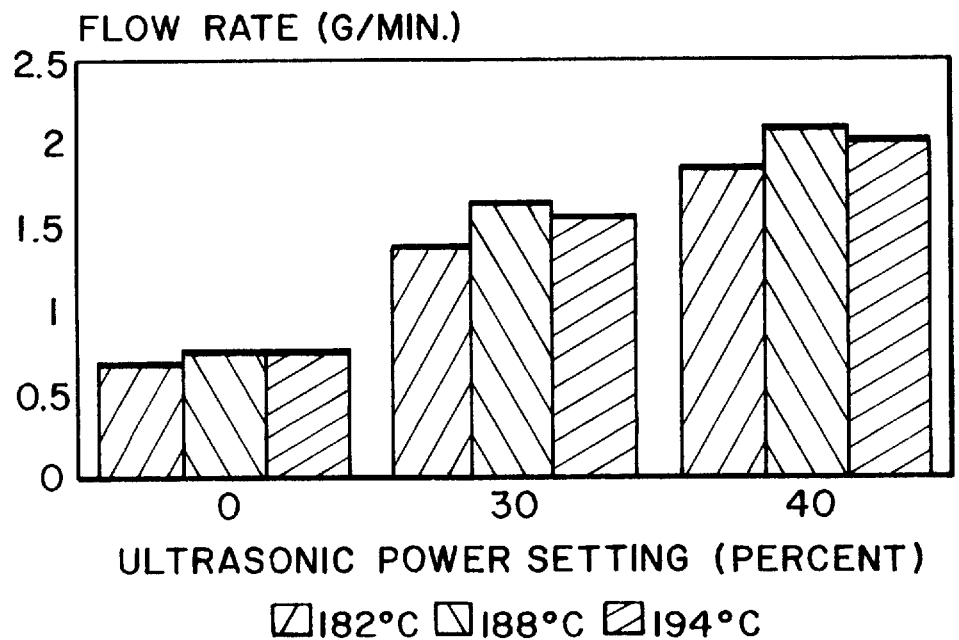
FIGS. 2–6 are plots of polymer flow rates through an orifice at various temperatures without the application of ultrasonic energy and with the application of ultrasonic energy at two different power levels.
Figure 3:
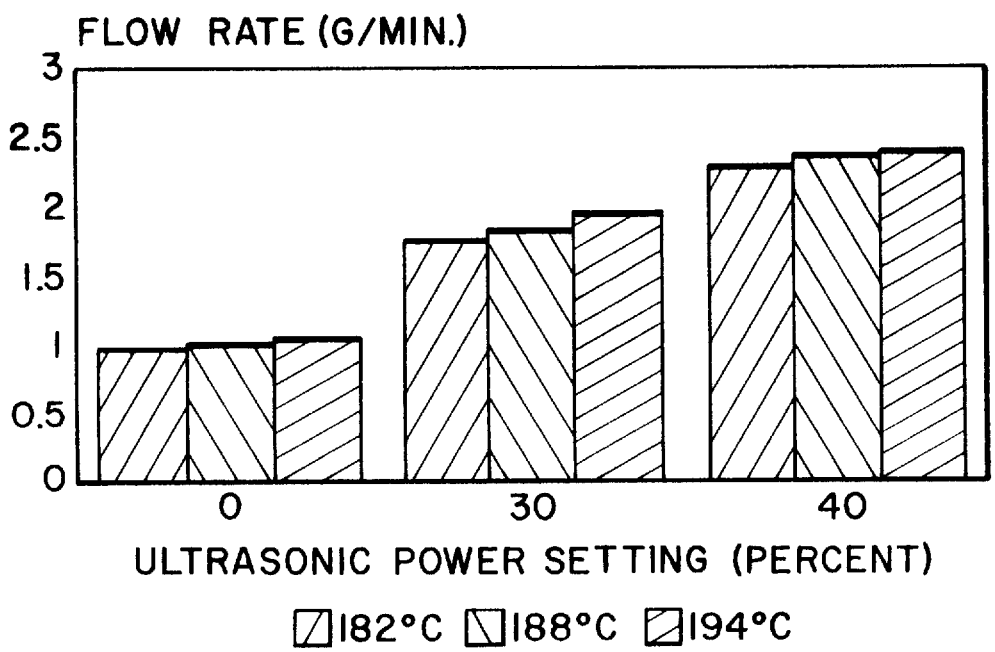
Figure 4:
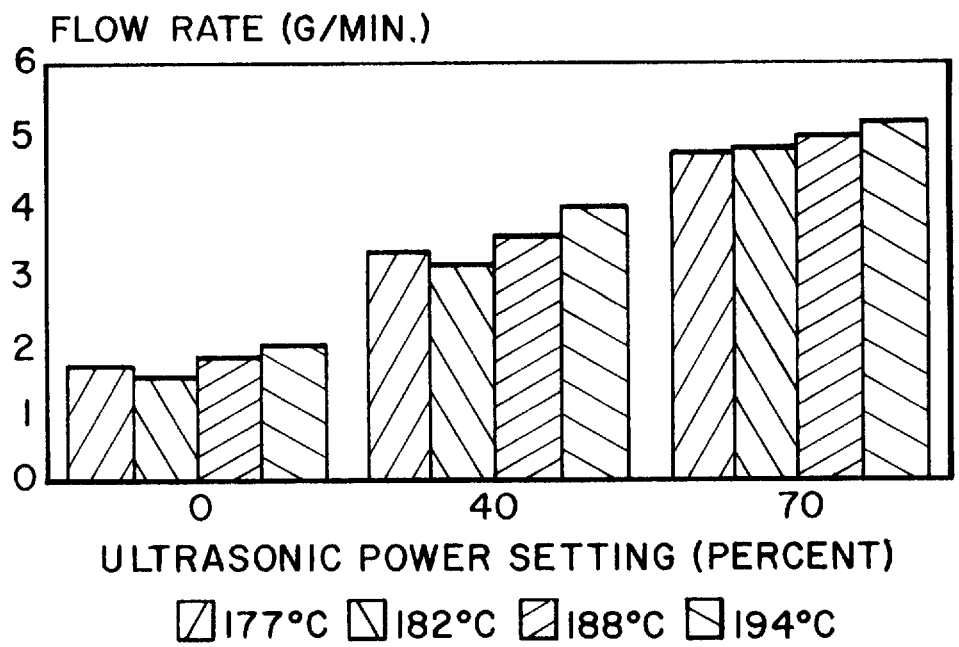
Figure 5:
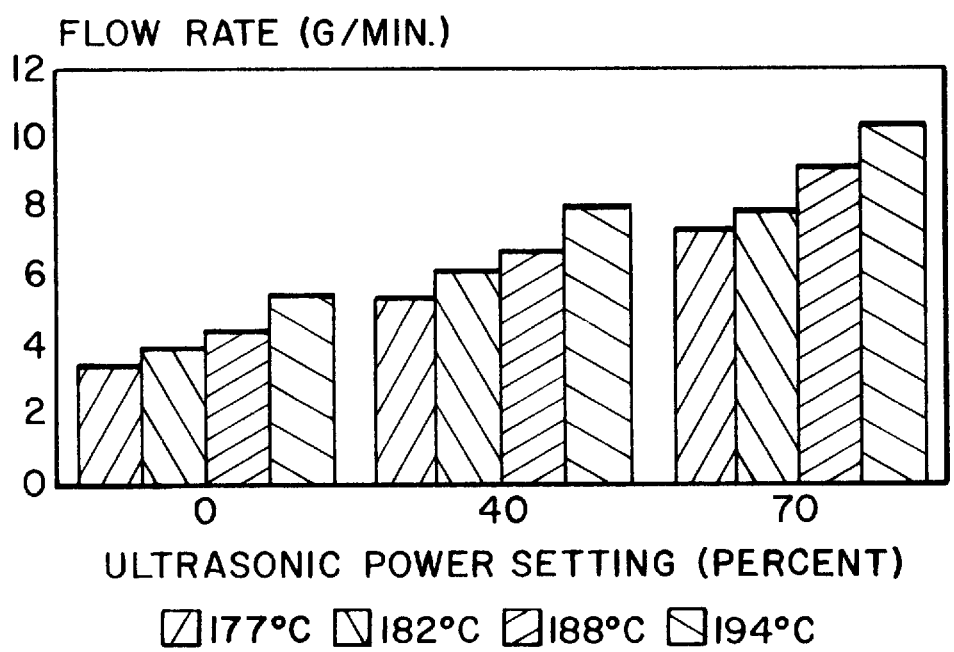
Figure 6:
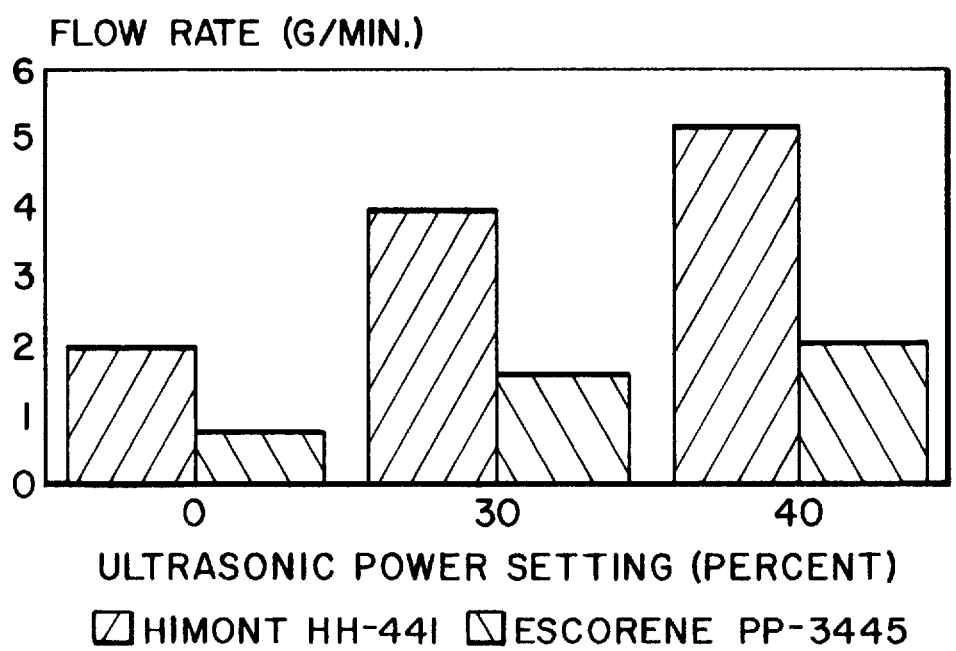

The data in Tables 2 and 3 suggest that the application of ultrasonic energy increases the polymer flow rate through the orifice, regardless of the temperature of the melt, compared to the flow rate without the application of ultrasonic energy. In order to better understand the data, however, the data were plotted as percent ultrasonic power setting versus the observed melt flow rate in grams per minute. The plot for Trials 1–9 (Table 2) is shown in FIG. 2 and the plot for Trials 10–18 (Table 2) is shown in FIG. 3. Similarly, the plots for Trials 19–30 and Trials 31–42 (Table 3) are shown in FIGS. 4 and 5, respectively. Finally, FIG. 6 is a similar plot of the data for Trials 1–3 from Table 2 and Trials 19–21 from Table 3.

FIGS. 2–5, FIGS. 4 and 5 in particular, suggest that increasing ultrasonic power results in essentially linear increases in the observed melt flow rate through the orifice. Moreover, such increases in melt flow rate occurred at each extrusion temperature studied. FIG. 6 demonstrates that the application of ultrasonic energy permits extrusion of a 30 melt flow rate polymer as though it were a 400 melt flow rate polymer without the application of ultrasonic energy. The implication is, of course, that the benefits of lower melt flow rate polymers (i.e., higher molecular weight polymers) can be realized under processing conditions typically employed for higher melt flow rate polymers. Such benefits include, by way of illustration only, the production of fibers having higher melting points and higher tensile strength characteristics. Conversely, the method of the present invention permits extruding a given polymer at a lower temperature without sacrificing throughput.

Example 4

This example illustrates the present invention as it relates to relatively free-flowing liquids such as, for example, hydrocarbon based oils. The ultrasonic device utilized in this example is called an immersed horn. A detailed description of an exemplary immersed horn may be found in FIG. 1 and is described above.

Piping on the high pressure side of the system was ¼" stainless steel tubing. The capillary tip had an orifice opening of 0.0145 inch in diameter and a capillary length of 0.087 inch. Accordingly, the capillary had a length to diameter ratio (L/D) of 6. The opening on the tip opposite the capillary was 0.125 inch in diameter. The walls of the opening narrowed at an angle of 30 degrees until the opening was at the appropriate capillary diameter.

The oil chosen for the trials was a petroleum-based viscosity standard oil obtained from the Cannon Instrument Company of State College, Pennsylvania, standard number N1000, lot #92102. The oil had a viscosity at 20° C. of 4216 centipoise (cP) (SI units are mpa•s); a viscosity of 2716 cP; at 25° C.; a viscosity of 839 cP at 40° C.; a viscosity of 235 cP at 60° C.; and a viscosity of 40 cP at 100° C.

Flow rate trials were conducted on the immersed horn with the 0.0145 inch diameter tip either without ultrasonic power or at 50% of available power. The temperature of the extrudate was monitored by placing a bare junction thermocouple in the stream within ¼" of the exit, and reading the signal from the thermocouple with a hand-held pyrometer. Results of the trials are shown in Table 4. In Table 4, the "Pressure" column is the pressure in psig, the "Pump" column refers to the pump speed in revolutions per minute, the "Mass" column refers to the mass of the test liquid (i.e., oil) collected and is expressed in grams, the "Temp." column identifies the temperature as read from the hand-held pyrometer, the "Time" column refers to the amount of time liquid was collected and is expressed in seconds, the "Watts" column refers to power consumption at a given power setting, and the "Rate" column refers to the flow rate measured for each trial, expressed in g/min.

TABLE 4

Flow Rates With 0.0145 Inch Tip at 0 and 50% Power

| Pressure | Pump | Mass | Temp. | Time | Watts | Rate |
| --- | --- | --- | --- | --- | --- | --- |
| 120 | 2.9 | 1.82 | 67.8 | 30 | -0- | 3.64 |
| 140 | 3.6 | 2.07 | 67.4 | 30 |  | 4.14 |
| 160 | 3.9 | 2.34 | 66.9 | 30 |  | 4.68 |
| 180 | 4.3 | 2.55 | 66.3 | 30 |  | 5.10 |
| 200 | 4.8 | 2.85 | 66.0 | 30 |  | 5.70 |
| 220 | 5.2 | 3.07 | 65.6 | 30 |  | 6.14 |
| 240 | 5.9 | 3.30 | 65.4 | 30 |  | 6.60 |
| 260 | 6.2 | 3.49 | 65.1 | 30 |  | 6.98 |
| 140 | 25.0 | 7.96 | 83.8 | 15 | 90.0 | 31.84 |
| 160 | 34.0 | 10.96 | 81.5 | 15 | 85.0 | 43.84 |
| 180 | 50.0 | 17.97 | 80.4 | 15 | 80.0 | 71.88 |

TABLE 4-continued

Flow Rates With 0.0145 Inch Tip at 0 and 50% Power

| Pressure | Pump | Mass | Temp. | Time | Watts | Rate |
| --- | --- | --- | --- | --- | --- | --- |
| 200 | 53.0 | 16.32 | 96.0 | 15 | 80.0 | 64.92 |
| 220 | 62.0 | 19.62 | 93.0 | 15 | 80.0 | 78.48 |

Example 5

This example illustrates the present invention as it relates to a relatively viscous liquid (i.e., corn syrup) utilizing the same ultrasonic device (immersed horn) as Example 4 set up in the same configuration with the following exceptions:

Two different orifices were used. One had a diameter of 0.025 inch and a length of 0.045 inch (L/D ratio of 1.8) and the other had a diameter of 0.0145 and a length of 0.087 inch (L/D ratio of 6).

The liquid used was Karo brand light corn syrup, product manufacture code #214A5, available from Best Foods Division, CPC International, Englewood Cliffs, N.J. The corn syrup had a kinematic viscosity of 3392 cP at 25° Centigrade.

Flow rate trials were conducted on the immersed horn with the various tips without ultrasonic power, at 90 watts of power (20% of available power), and at 100 watts of power (30% of available power). Results of the trials are shown in Table 6. In Table 6, the "Pressure" column is the pressure in psig, the "Percent" column refers to the amount of power consumes as a percentage of available power, the "Watts" column refers to power consumption in watts at a given power setting, and the "Rate" column refers to the flow rate measured for each trial, expressed in g/min.

TABLE 5

Corn Syrup

| Pressure | POWER | | |
| --- | --- | --- | --- |
|  | Percent | Watts | Rate |
| Capillary Tip - 0.025" Diameter x 0.045" Length | | | |
| 120 | — | 0 | 47.12 |
|  | 20 | 90 | 81.88 |
|  | 30 | 100 | 103.08 |
| 160 | — | 0 | 93.52 |
|  | 20 | 90 | 139.72 |
|  | 30 | 100 | 170.60 |
| Capillary Tip - 0.0145" Diameter x 0.087" Length | | | |
| 120 | — | 0 | 19.20 |
|  | 20 | 90 | 37.80 |
|  | 30 | 100 | 51.48 |
| 160 | — | 0 | 35.04 |
|  | 20 | 90 | 59.84 |
|  | 30 | 100 | 66.36 |

Example 6

This example illustrates the present invention as it relates to improving the flow of a variety of liquids through an orifice utilizing the same 20 kHz ultrasonic device (immersed horn) as Example 4 set up in the same configuration. The following liquids were used:

Water.

Non-toxic Food Grade H-1 Gear Oil 90 from Bel-Ray Company, Farmingdale, N.J. Viscosity=416 cP measured with a Brooksfield Model DV-II viscometer for a 2 mL sample at 25° C. and a (#CP-41) 3.0° core spindle cone.

Cannon Certified Viscosity Standard N1000 Oil, Lot Number 93101 from the Cannon Instrument Company of State College, Pa. Viscosity=2923 cP measured with a Brooksfield Model DV-II viscometer for a 2 mL sample at 25° C. and a (#CP-41) 3.0° core spindle cone.

EP Hydraulic Oil 32 from Motor Oil, Inc., Elk Grove Village, Ill. Viscosity=43.2 cP measured with a Brooksfield Model DV-II viscometer for a 2 mL sample at 25° C. and a (#CP-41) 3.0° core spindle cone.

EP Hydraulic Oil 68 from Motor Oil, Inc., Elk Grove Village, Ill. Viscosity=106.8 cP measured with a Brooksfield Model DV-II viscometer for a 2 mL sample at 25° C. and a (#CP-41) 3.0° core spindle cone.

Karo Light Corn Syrup, Product Manufacturing Code #214A5, from Best Foods Division of CPC International, Inc. of Englewood Cliffs, N.J. Viscosity was 3392 cP at 77° F.

Figure 7:
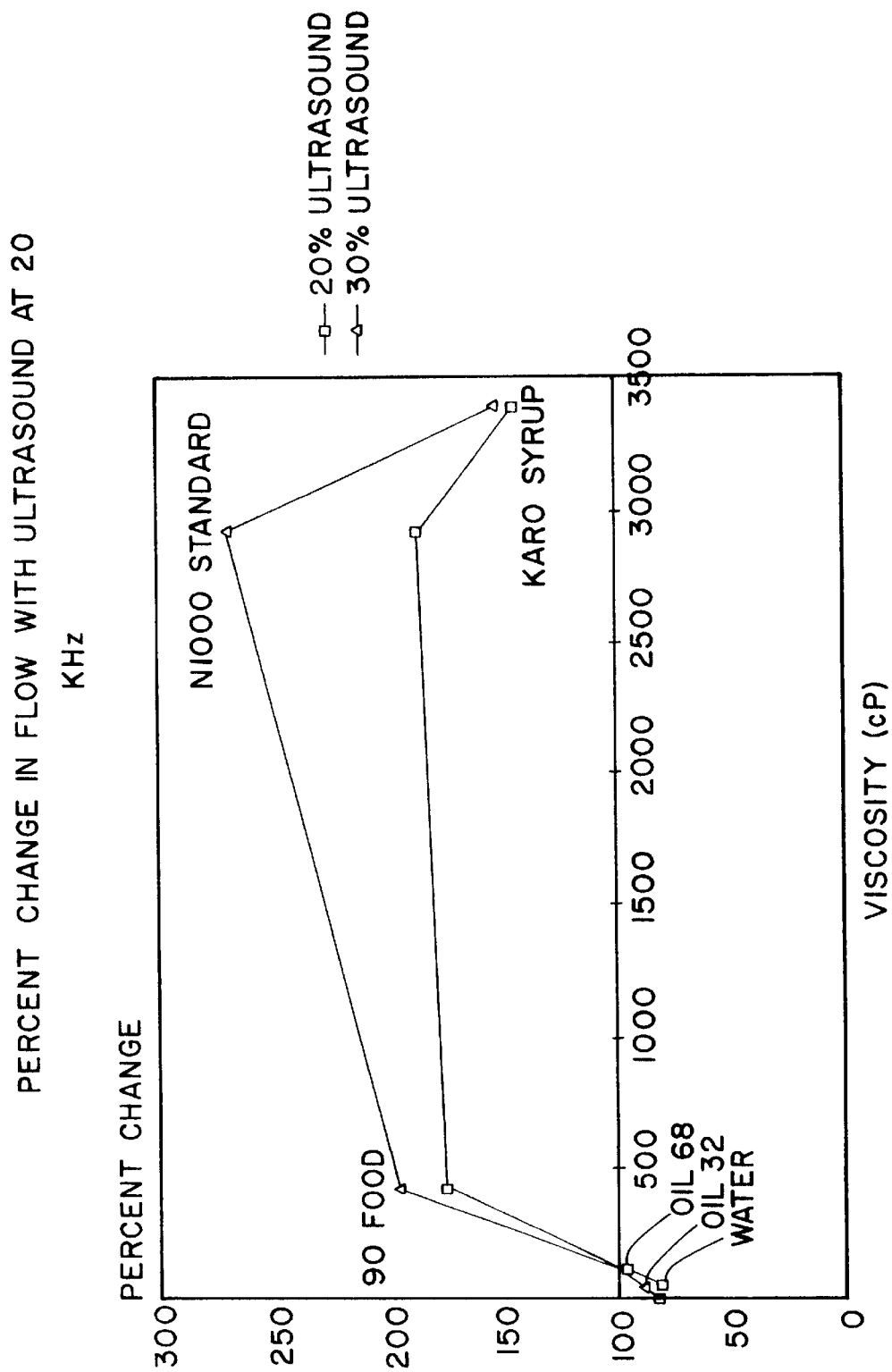
FIG. 7 is a graphical representation of the results of Example 6.

Flow rate trials were conducted on the immersed horn with the various tips without ultrasonic energy, with applied ultrasonic energy at 20% of available power as indicated by the Branson power controller, and with applied ultrasonic energy at 30% of available power as indicated by the Branson power controller. Results of the trials are reported in Tables 6–11 and are shown graphically in FIG. 7.

TABLE 6

90 Weight Food Grade Gear Oil

| Press. (PSI) | No Ultrasound Flow (g/min) | 20% Ultrasound Flow (g/min) | Change (%) | 30% Ultrasound Flow (g/min) | Change (%) |
|---|---|---|---|---|---|
| Capillary Tip 0.0145" diameter × 0.087" length ||||||
| 150 | 29.36 | 95.72 | 326.02 | 99.28 | 338.15 |
| 200 | 65.16 | 92.56 | 142.05 | 95.88 | 147.15 |
| 280 | 80.35 | 86.50 | 107.65 | 101.10 | 125.82 |
| Capillary Tip 0.010" diameter × 0.020" length ||||||
| 150 | 23.48 | 49.40 | 210.39 | 58.52 | 249.23 |
| 200 | 37.32 | 54.44 | 145.87 | 59.80 | 160.24 |
| 280 | 52.64 | 66.48 | 126.29 | 82.16 | 156.08 |

TABLE 7

N1000 Standard Viscosity Oil

| Press. (PSI) | No Ultrasound Flow (g/min) | 20% Ultrasound Flow (g/min) | Change (%) | 30% Ultrasound Flow (g/min) | Change (%) |
|---|---|---|---|---|---|
| Capillary Tip 0.0145" diameter × 0.087" length ||||||
| 150 | 18.56 | 42.28 | 227.80 | 62.28 | 335.56 |
| 200 | 28.60 | 32.64 | 114.13 | 63.88 | 223.36 |
| 240 | 24.80 | 35.88 | 144.68 | 62.32 | 251.29 |
| 280 | 37.92 | 62.04 | 163.61 | N/A | N/A |
| 320 | 12.75 | 30.48 | 239.06 | N/A | N/A |
| Capillary Tip 0.010" diameter × 0.020" length ||||||
| 150 | 20.96 | 35.00 | 166.98 | 44.60 | 212.79 |
| 200 | 16.00 | 25.44 | 159.00 | 39.20 | 245.00 |
| 240 | 15.68 | 27.40 | 174.74 | 44.56 | 284.18 |
| 280 | 23.04 | 41.92 | 181.94 | 59.92 | 260.07 |
| 320 | 26.84 | 55.68 | 207.45 | 74.36 | 277.05 |

TABLE 7-continued

N1000 Standard Viscosity Oil

| Press. (PSI) | No Ultrasound Flow (g/min) | 20% Ultrasound Flow (g/min) | Change (%) | 30% Ultrasound Flow (g/min) | Change (%) |
|---|---|---|---|---|---|
| Capillary Tip 0.010" diameter × 0.010" length ||||||
| 150 | 5.96 | 23.16 | 388.59 | 35.40 | 593.96 |
| 200 | 18.20 | 30.56 | 167.91 | 42.52 | 233.63 |
| 240 | 20.24 | 38.88 | 192.09 | 53.00 | 261.86 |
| 280 | 35.67 | 50.96 | 142.87 | 51.36 | 143.99 |
| 320 | 32.80 | 46.52 | 141.83 | 64.36 | 196.22 |

TABLE 8

EP Hydraulic Oil 32

| Press. (PSI) | No Ultrasound Flow (g/min) | 20% Ultrasound Flow (g/min) | Change (%) | 30% Ultrasound Flow (g/min) | Change (%) |
|---|---|---|---|---|---|
| Capillary Tip 0.006" diameter × 0.006" length ||||||
| 200 | 42.92 | 31.52 | 73.44 | 31.88 | 74.28 |
| 300 | 53.84 | 38.60 | 71.69 | 39.84 | 74.00 |
| 400 | 61.04 | 46.32 | 75.88 | 45.16 | 73.98 |
| 500 | 69.56 | 50.80 | 73.03 | 51.56 | 74.12 |
| 600 | 75.72 | 55.16 | 72.85 | 55.40 | 73.16 |
| 700 | 77.32 | 60.12 | 77.75 | 57.92 | 74.91 |
| Capillary Tip 0.006" diameter × 0.010" length ||||||
| 200 | 29.80 | 25.80 | 86.58 | 25.48 | 85.50 |
| 300 | 42.44 | 35.00 | 82.47 | 34.32 | 80.87 |
| 400 | 51.36 | 40.24 | 78.35 | 39.20 | 76.32 |
| 500 | 60.24 | 44.80 | 74.37 | 44.08 | 73.17 |
| 600 | 67.28 | 47.96 | 71.28 | 49.44 | 73.48 |
| 700 | 74.64 | 60.84 | 81.51 | 55.52 | 74.38 |
| Capillary Tip 0.004" diameter × 0.006" length ||||||
| 200 | 18.04 | 20.56 | 113.97 | 22.88 | 126.83 |
| 300 | 31.60 | 27.28 | 86.33 | 27.72 | 37.72 |
| 400 | 37.72 | 30.88 | 81.87 | 32.76 | 86.85 |
| 500 | 45.28 | 37.16 | 82.07 | 37.40 | 82.60 |
| 600 | 48.16 | 41.72 | 86.63 | 88.56 | 183.89 |

TABLE 9

EP Hydraulic Oil 68

| Press. (PSI) | No Ultrasound Flow (g/min) | 20% Ultrasound Flow (g/min) | Change (%) | 30% Ultrasound Flow (g/min) | Change (%) |
|---|---|---|---|---|---|
| Capillary Tip 0.010" diameter × 0.010" length ||||||
| 200 | 84.48 | 80.24 | 94.98 | 88.32 | 104.55 |
| 300 | 123.04 | 99.00 | 80.46 | 95.15 | 77.33 |
| 400 | 122.00 | 103.75 | 85.04 | 102.10 | 83.69 |
| 500 | 149.30 | 125.65 | 84.16 | 123.80 | 82.92 |
| 600 | 157.30 | 124.75 | 79.31 | 125.50 | 79.78 |
| Capillary Tip 0.010" diameter × 0.020" length ||||||
| 200 | 52.76 | 71.96 | 136.39 | 69.24 | 131.24 |
| 300 | 90.48 | 91.68 | 101.33 | 96.48 | 106.63 |
| 400 | 96.35 | 94.95 | 98.55 | 95.95 | 99.58 |
| 500 | 128.35 | 107.60 | 83.83 | 107.55 | 83.79 |
| 600 | 145.60 | 116.95 | 80.32 | 121.80 | 83.65 |
| 700 | 156.20 | 157.50 | 100.83 | 136.75 | 87.55 |

TABLE 9-continued

EP Hydraulic Oil 68

| | No Ultrasound | 20% Ultrasound | | 30% Ultrasound | |
|---|---|---|---|---|---|
| Press. (PSI) | Flow (g/min) | Flow (g/min) | Change (%) | Flow (g/min) | Change (%) |
| Capiilary Tip 0.006" diameter x 0.006" length | | | | | |
| 200 | 33.48 | 28.48 | 85.07 | 28.16 | 84.11 |
| 300 | 46.28 | 34.84 | 75.28 | 35.24 | 76.15 |
| 400 | 45.32 | 38.56 | 85.08 | 35.36 | 78.02 |
| 500 | 54.80 | 41.68 | 76.06 | 43.12 | 78.69 |
| 600 | 63.20 | 47.76 | 75.57 | 48.24 | 76.33 |
| 700 | 69.32 | 62.16 | 89.67 | 55.72 | 80.38 |
| Capillary Tip 0.006" diameter x 0.010" length | | | | | |
| 200 | 18.04 | 22.88 | 126.83 | 25.56 | 141.69 |
| 300 | 36.00 | 31.76 | 88.22 | 33.56 | 93.22 |
| 400 | 45.00 | 36.12 | 80.27 | 37.12 | 82.49 |
| 500 | 52.56 | 43.16 | 82.12 | 43.52 | 82.80 |
| 600 | 55.52 | 47.32 | 85.23 | 48.44 | 87.25 |
| 700 | 70.12 | 63.88 | 91.10 | 49.28 | 70.28 |
| Capillary Tip 0.004" diameter x 0.006" length | | | | | |
| 200 | 24.64 | 34.32 | 139.29 | 34.00 | 137.99 |
| 300 | 30.88 | 53.64 | 173.70 | 57.40 | 185.88 |
| 400 | 38.88 | 28.64 | 73.66 | 30.60 | 78.70 |
| 500 | 41.08 | 32.88 | 80.04 | 31.92 | 77.70 |
| 600 | 46.64 | 33.04 | 70.84 | 33.76 | 72.38 |
| 700 | 48.20 | 35.60 | 73.86 | 57.36 | 119.00 |
| Capillary Tip 0.004" diameter x 0.004" length | | | | | |
| 200 | 6.92 | 17.64 | 254.91 | 16.48 | 238.15 |
| 300 | 14.52 | 17.28 | 119.01 | 16.04 | 110.47 |
| 400 | 18.84 | 19.32 | 102.55 | 20.28 | 107.64 |
| 500 | 26.20 | 21.76 | 83.05 | 22.32 | 85.19 |
| 600 | 18.88 | 21.24 | 112.50 | 19.52 | 103.39 |
| 700 | 33.08 | 29.40 | 88.88 | 31.36 | 94.80 |
| 800 | 48.28 | 44.44 | 92.05 | 50.60 | 104.81 |

TABLE 10

Karo Syrup

| | No Ultrasound | 20% Ultrasound | | 30% Ultrasound | |
|---|---|---|---|---|---|
| Press. (PSI) | Flow (g/min) | Flow (g/min) | Change (%) | Flow (g/min) | Change (%) |
| Capiilary Tip 0.025" diameter x 0.045" length | | | | | |
| 100 | 36.44 | 65.44 | 179.58 | 68.68 | 188.47 |

TABLE 10-continued

Karo Syrup

| | No Ultrasound | 20% Ultrasound | | 30% Ultrasound | |
|---|---|---|---|---|---|
| Press. (PSI) | Flow (g/min) | Flow (g/min) | Change (%) | Flow (g/min) | Change (%) |
| 120 | 63.08 | 82.60 | 130.94 | 92.76 | 147.05 |
| Capillary Tip 0.010" diameter x 0.020" length | | | | | |
| 100 | 72.45 | 96.50 | 133.20 | 99.60 | 137.47 |
| 110 | N/A | 115.35 | | 116.45 | |
| 120 | 101.15 | N/A | | N/A | |

Example 7

This example illustrates the present invention as it relates to improving the flow of a variety of liquids through an orifice utilizing a 40 kHz ultrasonic device (immersed horn). The device was set up in the same configuration as the previous example. The ultrasonic horn and the chamber into which the horn fit were exactly one-half the length of the 20 kHz horn. The 40 kHz amplifier was a type that operated at full capacity and adjusted its output to match the load.

The liquids used in this example were identical to those used in Example 6 with the following exceptions:

Non-toxic Food Grade H-1 Gear Oil 140 from Bel-Ray Company, Farmingdale, N.J. Viscosity=750 cP measured with a Brooksfield Model DV-II viscometer for a 2 mL sample at 25° C. and a (#CP-41) 3.0° core spindle cone.

Non-toxic Food Grade H-1 Gear Oil 90/140 from Bel-Ray Company, Farmingdale, N.J. Viscosity=496 cP measured with a Brooksfield Model DV-II viscometer for a 2 mL sample at 25° C. and a (#CP-41) 3.0° core spindle cone.

Lubricating Oil 100 from Motor Oil, Inc., Elk Grove Village, Ill. Viscosity=163 cP measured with a Brooksfield Model DV-II viscometer for a 2 mL sample at 25° C. and a (#CP-41) 3.0° core spindle cone.

Figure 8:
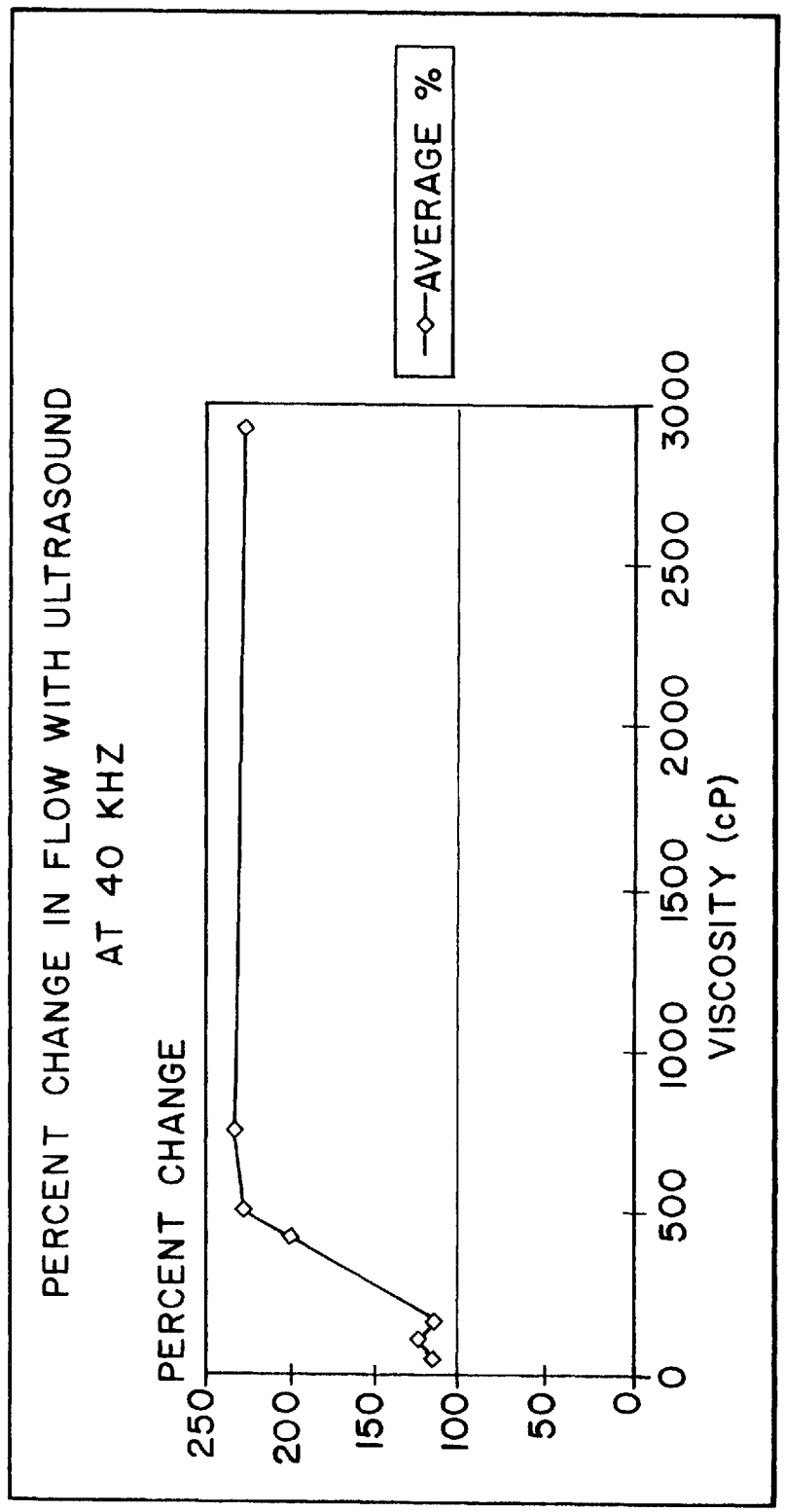
FIG. 8 is a graphical representation of the results of Example 7.
Figure 9:
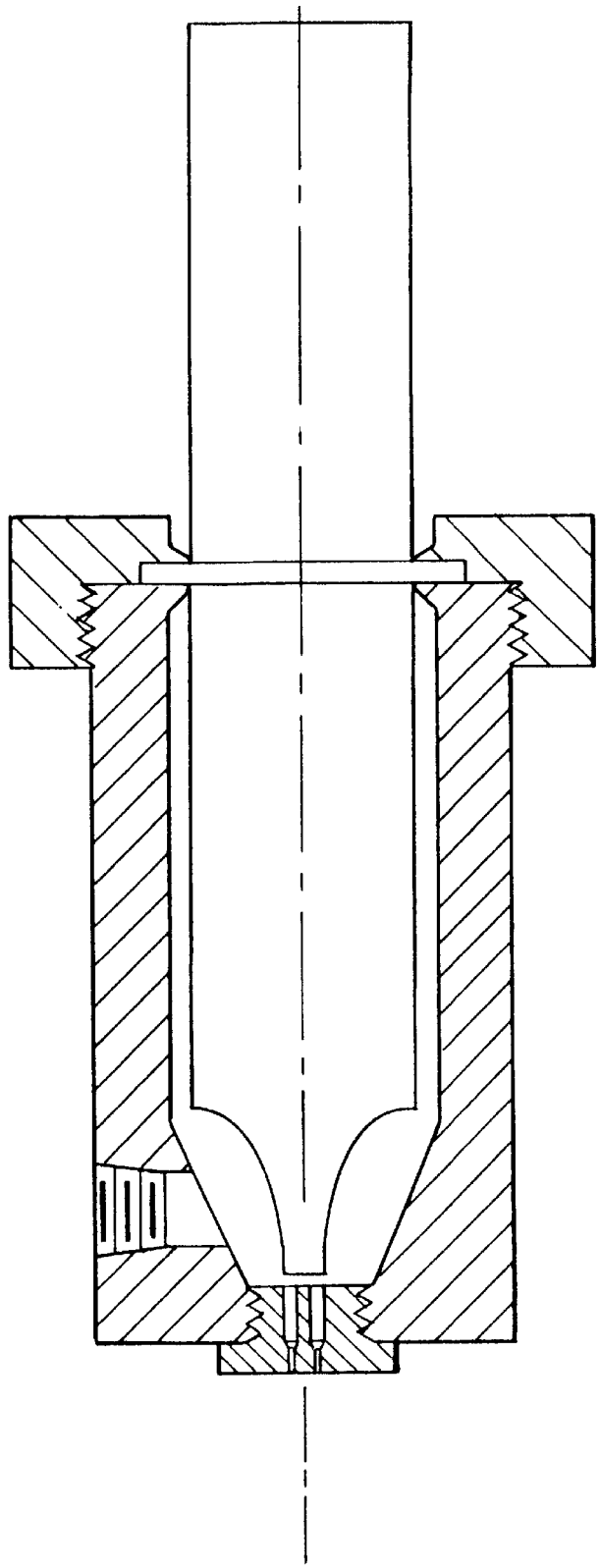
FIG. 9 is a diagrammatic cross-sectional representation of another embodiment of the apparatus of the present invention.

Flow rate trials were conducted on the immersed horn with the various tips without ultrasonic energy, with applied ultrasonic energy at 20% of available power as indicated by the Branson power controller, and with applied ultrasonic energy at various wattages as indicated by the Branson power controller. Results of the trials are reported in Tables 11–17 and are shown graphically in FIG. 8.

TABLE 11

N1000 Standard Viscosity Oil

| PRESS psi | POWER watts | TEMP F. | RATE g/min | POWER watts | TEMP F. | RATE g/min | CHANGE % |
|---|---|---|---|---|---|---|---|
| Capillary Tip 0.0145" diameter x 0.087" length | | | | | | | |
| 150 | 0 | 69 | 8.76 | 65 | 101 | 22.96 | 262.1 |
| 200 | 0 | 69 | 11.76 | 85 | 104 | 42.96 | 365.3 |
| 240 | 0 | 69 | 13.84 | 85 | 107 | 50.84 | 367.3 |
| 280 | 0 | 69 | 15.88 | 75 | 99 | 47.30 | 297.9 |
| 320 | 0 | 69 | 18.62 | 75 | 105 | 55.14 | 296.1 |
| Capillary Tip 0.010" diameter x 0.010" length | | | | | | | |
| 150 | 0 | 74.6 | 7.76 | 85 | 116 | 10.51 | 135.4 |
| 200 | 0 | 74.6 | 9.12 | 80 | 106 | 16.04 | 175.9 |
| 240 | 0 | 74.6 | 10.82 | 80 | 104 | 17.18 | 158.8 |

TABLE 11-continued

N1000 Standard Viscosity Oil

| PRESS psi | POWER watts | TEMP F. | RATE g/min | POWER watts | TEMP F. | RATE g/min | CHANGE % |
|---|---|---|---|---|---|---|---|
| 280 | 0 | 74.6 | 12.79 | 65* | 101 | 18.00 | 140.7 |
| 320 | 0 | 74.6 | 15.03 | 55* | 110 | 14.45 | 96.1 |

*Transducer could not maintain resonance at this pressure, power drop-off.

TABLE 12

140 Weight Food Grade Gear Oil
Capillary Tip 0.010" diameter × 0.010" length

| PRESS psi | POWER watts | TEMP F. | RATE g/min | POWER watts | TEMP F. | RATE g/min | CHANGE % |
|---|---|---|---|---|---|---|---|
| 150 | 0 | 78.2 | 13.82 | 85 | 99 | 32.86 | 237.8 |
| 200 | 0 | 78.2 | 19.35 | 85 | 102 | 46.66 | 241.1 |
| 240 | 0 | 78.2 | 23.23 | 85 | 102 | 55.38 | 238.4 |
| 280 | 0 | 78.2 | 28.22 | 65* | 102 | 60.82 | 215.5 |

*Transducer could not maintain resonance at this pressure, power drop-off.

TABLE 13

90/140 Weight Food Grade Gear Oil
Capillary Tip 0.010" diameter × 0.010" length

| PRESS psi | POWER watts | TEMP F. | RATE g/min | POWER watts | TEMP F. | RATE g/min | CHANGE % |
|---|---|---|---|---|---|---|---|
| 150 | 0 | 72 | 16.87 | 80 | 90 | 48.20 | 285.7 |
| 200 | 0 | 72 | 24.71 | 90 | 93 | 64.02 | 259.1 |
| 240 | 0 | 72 | 31.33 | 80 | 93 | 69.66 | 222.3 |
| 280 | 0 | 72 | 48.52 | 75 | 89 | 67.17 | 138.4 |

TABLE 14

90 Weight Food Grade Gear Oil
Capillary Tip 0.010" diameter × 0.010" length

| PRESS psi | POWER watts | TEMP F. | RATE g/min | POWER watts | TEMP F. | RATE g/min | CHANGE % |
|---|---|---|---|---|---|---|---|
| 150 | 0 | 72 | 20.13 | 80 | 80 | 45.52 | 226.1 |
| 200 | 0 | 72 | 29.54 | 80 | 90 | 61.82 | 209.3 |
| 240 | 0 | 72 | 36.44 | 80 | 92 | 69.03 | 189.4 |
| 280 | 0 | 72 | 45.20 | 60 | 85 | 77.64 | 171.8 |

TABLE 15

Lubricating Oil 100
Capillary Tip 0.010" diameter × 0.010" length

| PRESS psi | POWER watts | TEMP F. | RATE g/min | POWER watts | TEMP F. | RATE g/min | CHANGE % |
|---|---|---|---|---|---|---|---|
| 150 | 0 | 75 | 39.44 | 85 | 85 | 54.78 | 138.9 |
| 200 | 0 | 75 | 56.01 | 85 | 90 | 62.79 | 112.1 |
| 240 | 0 | 75 | 62.49 | 80 | 85 | 68.91 | 110.3 |
| 280 | 0 | 75 | 76.98 | 75 | 85 | 74.91 | 97.3 |

TABLE 16

EP Hydraulic Oil 68
Capillary Tip 0.010" diameter × 0.010" length

| PRESS psi | POWER watts | TEMP F. | RATE g/min | POWER watts | TEMP F. | RATE g/min | CHANGE % |
|---|---|---|---|---|---|---|---|
| 150 | 0 | 72 | 59.28 | 80 | 74 | 76.08 | 128.3 |
| 200 | 0 | 72 | 73.11 | 80 | 76 | 96.69 | 132.3 |
| 240 | 0 | 72 | 82.83 | 60 | 77 | 103.14 | 124.5 |
| 280 | 0 | 72 | 99.99 | 75 | 78 | 111.72 | 111.7 |

TABLE 17

EP Hydraulic Oil 32
Capillary Tip 0.010" diameter × 0.010" length

| PRESS psi | POWER watts | TEMP F. | RATE g/min | POWER watts | TEMP F. | RATE g/min | CHANGE % |
|---|---|---|---|---|---|---|---|
| 150 | 0 | 72 | 71.60 | 130 | 77 | 90.48 | 126.4 |
| 200 | 0 | 72 | 95.60 | 170 | 77 | 114.42 | 119.7 |
| 240 | 0 | 72 | 107.64 | 170 | 77 | 117.54 | 109.2 |
| 280 | 0 | 72 | 121.98 | 170 | 77 | 133.56 | 109.5 |

Related Applications

This application is one of a group of commonly assigned patent applications which are being filed on the same date. The group includes application Ser. No. 08/576,543 entitled "An Apparatus And Method For Emulsifying A Pressurized Multi-Component Liquid", Docket No. 12535, in the name of L. K. Jameson et al.; application Ser. No. 08/576,536 entitled "An Apparatus And Method For Ultrasonically Producing A Spray Of Liquid", Docket No. 12536, in the name of L. H. Gipson et al.; application Ser. No. 08/576,522 entitled "Ultrasonic Fuel Injection Method And Apparatus", Docket No. 12537, in the name of L. H. Gipson et al.; application Ser. No. 08/576,174 entitled "An Ultrasonic Apparatus And Method For Increasing The Flow Rate Of A Liquid Through An Orifice", Docket No. 12538, in the name of B. Cohen et al.; and application Ser. No. 08/576,175 entitled "Ultrasonic Flow Control Apparatus And Method", Docket No. 12539, in the name of B. Cohen et al. The subject matter of these applications is hereby incorporated by reference.

The foregoing description relates to preferred embodiments of the present invention, modifications or alterations may be made without departing from the spirit and scope of the invention as defined in the following claims.

What is claimed is:

1. An apparatus for increasing the flow rate of pressurized liquid through an orifice, the apparatus comprising:
   a die housing defining:
      a chamber adapted to receive a pressurized liquid;
      an inlet in communication with said chamber and adapted to supply the chamber with the pressurized liquid; and
      an exit orifice in communication with said chamber and defined by the walls of a die tip, the exit orifice being adapted to receive the pressurized liquid from the chamber and pass the liquid out of the die housing; and
   a means for applying ultrasonic energy to a portion of the pressurized liquid within the chamber without applying ultrasonic energy to the die tip, wherein the means for applying ultrasonic energy is located within the chamber, wherein the flow rate of the pressurized liquid is at least about 25 percent greater than the flow rate of an identical pressurized liquid out of an identical die housing through an identical exit orifice in the absence of excitation by ultrasonic energy.

2. The apparatus of claim 1, wherein the means for applying ultrasonic energy is an immersed ultrasonic horn.

3. The apparatus of claim 1, wherein the means for applying ultrasonic energy is an immersed magnetostrictive ultrasonic horn.

4. The apparatus of claim 1, wherein the exit orifice is a plurality of exit orifices.

5. The apparatus of claim 1, wherein the exit orifice is a single exit orifice.

6. The apparatus of claim 1, wherein the exit orifice has a diameter of from about 0.0001 to about 0.1 inch.

7. The apparatus of claim 6, wherein the exit orifice has a diameter of from about 0.001 to about 0.01 inch.

8. The apparatus of claim 1, wherein the exit orifice is an exit capillary.

9. The apparatus of claim 8, wherein the exit capillary has a length to diameter ratio of from about 4:1 to about 10:1.

10. The apparatus of claim 1, wherein the ultrasonic energy has a frequency of from about 15 kHz to about 500 kHz.

11. An apparatus for increasing the flow rate of pressurized liquid through an orifice, the apparatus comprising:
   a die housing having a first end and a second end and defining:
      a chamber adapted to receive a pressurized liquid;
      an inlet in communication with said chamber and adapted to supply the chamber with the pressurized liquid; and
      an exit orifice in communication with said chamber and defined by the walls of a die tip, the exit orifice being located in the first end of the die housing and adapted to receive the pressurized liquid from the chamber and pass the liquid out of the die housing along a first axis; and an ultrasonic horn having a first end and a second end and adapted, upon excitation by ultrasonic energy, to have a node and a longitudinal mechanical excitation axis, the horn being located in the second end of the die housing in a manner such that the first end of the horn is located outside the die housing and the second end of the horn is located inside the die housing, within the chamber, and is in close proximity to the exit orifice but does not apply ultrasonic energy to the die tip, wherein the flow rate of the pressurized liquid is at least about 25 percent greater than the flow rate of an identical pressurized liquid out of an identical die housing through an identical exit orifice in the absence of excitation by ultrasonic energy.

12. The apparatus of claim 11, wherein the ultrasonic energy has a frequency of from about 15 kHz to about 500 kHz.

13. The apparatus of claim 11, wherein the longitudinal mechanical excitation axis is substantially parallel with the first axis.

14. The apparatus of claim 11, wherein the second end of the ultrasonic horn has a cross-sectional area approximately the same as or less than a minimum area which encompasses all exit orifices in the die housing.

15. The apparatus of claim 11, wherein the ultrasonic horn has coupled to the first end thereof a vibrator means as a source of longitudinal mechanical excitation.

16. The apparatus of claim 15, wherein the vibrator means is a piezoelectric transducer.

17. The apparatus of claim 16, wherein the piezoelectric transducer is coupled to the ultrasonic horn by means of an elongated waveguide.

18. The apparatus of claim 17, wherein the elongated waveguide has an input:output mechanical excitation ratio of from about 1:1 to about 1:2.5.

19. The apparatus of claim 15, wherein the vibrator means is a magnetostrictive transducer.

20. The apparatus of claim 11, wherein the means for applying ultrasonic energy is an immersed magentostrictive ultrasonic horn.

21. A method of increasing the flow rate of a pressurized liquid through an orifice, the method comprising:
  supplying a pressurized liquid to a die assembly, the die assembly being composed of:
    a die housing comprising:
      a chamber adapted to receive a pressurized liquid;
      an inlet in communication with said chamber and adapted to supply the chamber with the pressurized liquid; and
      an exit orifice in communication with said chamber and defined by the walls of a die tip, the exit orifice being adapted to receive the pressurized liquid from the chamber and pass the liquid out of the die housing; and
    a means for applying ultrasonic energy to a portion of the pressurized liquid within the chamber;
  exciting the means for applying ultrasonic energy with ultrasonic energy while the exit orifice receives pressurized liquid from the chamber, without applying ultrasonic energy to the die tip; and
  passing the pressurized liquid out of the exit orifice in the die tip, wherein the flow rate of the pressurized liquid is at least about 25 percent greater than the flow rate of an identical pressurized liquid out of an identical die housing through an identical exit orifice in the absence of excitation by ultrasonic energy.

22. The method of claim 21 wherein the means for applying ultrasonic energy is located within the chamber.

23. The method of claim 21, wherein the means for applying ultrasonic energy is an immersed ultrasonic horn.

24. The method of claim 21, wherein the means for applying ultrasonic energy is an immersed magnetostrictive ultrasonic horn.

25. The method of claim 21, wherein the exit orifice is an exit capillary.

26. The method of claim 21, wherein the ultrasonic energy has a frequency of from about 15 kHz to about 500 kHz.

27. The method of claim 21, wherein the ultrasonic energy has a frequency of from about 15 kHz to about 60 kHz.

28. The method of claim 21, wherein the flow rate of the pressurized liquid is at least about 75 percent greater than the flow rate of an identical pressurized liquid out of an identical die housing through an identical exit orifice in the absence of excitation by ultrasonic energy.

29. The method of claim 21, wherein the flow rate of the pressurized liquid is at least about 200 percent greater than the flow rate of an identical pressurized liquid out of an identical die housing through an identical exit orifice in the absence of excitation by ultrasonic energy.

30. A method of enhancing the flow of a pressurized liquid through an orifice, the method comprising:
  supplying a pressurized liquid to a die assembly composed of:
    a die housing comprising:
      a chamber adapted to receive a pressurized liquid; the chamber having a first end and a second end;
      an inlet in communication with said chamber and adapted to supply the chamber with the pressurized liquid; and
      an exit orifice in communication with said chamber and defined by walls in a die tip and located in the first end of the chamber and adapted to receive the pressurized liquid from the chamber and pass the liquid out of the die housing along a first axis; and
    an ultrasonic horn having a first end and a second end and adapted, upon excitation by ultrasonic energy, to have a node and a longitudinal mechanical excitation axis, the horn being located in the second end of the chamber in a manner such that the first end of the horn is located outside of the chamber and the second end of the horn is located within the chamber and is in close proximity to the extrusion orifice;
  exciting the ultrasonic horn with ultrasonic energy while the exit orifice receives pressurized liquid from the chamber and without applying ultrasonic energy to the die tip, and
  passing the liquid out of the exit orifice in the die tip, wherein the flow rate of the pressurized liquid is at least about 25 percent greater than the flow rate of an identical pressurized liquid out of an identical die housing through an identical exit orifice in the absence of excitation by ultrasonic energy.

31. The method of claim 30, wherein the exit orifice is an exit capillary.

32. The method of claim 30, wherein the ultrasonic energy has a frequency of from about 15 kHz to about 500 kHz.

* * * * *